United States Patent
Wilson, III

(10) Patent No.: US 7,211,611 B2
(45) Date of Patent: May 1, 2007

(54) RUBBER COMPOSITIONS WITH NON-PETROLEUM OILS

(75) Inventor: Thomas W Wilson, III, Taichung (TW)

(73) Assignee: Nike, Inc., Beaverton, OR (US)

( * ) Notice: Subject to any disclaimer, the term of this patent is extended or adjusted under 35 U.S.C. 154(b) by 278 days.

(21) Appl. No.: 10/733,603

(22) Filed: Dec. 11, 2003

(65) Prior Publication Data

US 2005/0131127 A1    Jun. 16, 2005

(51) Int. Cl.
*C08K 5/06* (2006.01)
*C08K 3/34* (2006.01)
*A43B 13/42* (2006.01)

(52) U.S. Cl. .................... 524/368; 524/493; 524/80; 523/167

(58) Field of Classification Search ........... 524/368, 524/493, 80; 523/167
See application file for complete search history.

(56) References Cited

U.S. PATENT DOCUMENTS

| | | |
|---|---|---|
| 4,500,685 A | 2/1985 | Ogawa et al. |
| 4,635,693 A | 1/1987 | Ahagon et al. |
| 5,001,185 A * | 3/1991 | Teratani et al. ............. 524/495 |
| 5,399,628 A | 3/1995 | Moczygemba et al. |
| 5,545,690 A | 8/1996 | Trepka et al. |
| 5,587,425 A | 12/1996 | Moczygemba et al. |
| 5,589,533 A | 12/1996 | Aikawa |
| 5,604,290 A | 2/1997 | Aikawa et al. |
| 6,193,835 B1 | 2/2001 | Yoshikawa et al. |
| 6,248,834 B1 | 6/2001 | Mori |
| 6,273,415 B1 | 8/2001 | Tengo et al. |
| 6,399,696 B1 | 6/2002 | Toyosawa et al. |
| 6,444,324 B1 | 9/2002 | Yang et al. |
| 6,458,883 B1 | 10/2002 | Takashima et al. |
| 6,620,871 B2 | 9/2003 | Wilson, III |
| 6,817,114 B2 | 11/2004 | Bredael |
| 2003/0100643 A1 | 5/2003 | Kikuchi |
| 2003/0100661 A1 | 5/2003 | Kikuchi et al. |

* cited by examiner

*Primary Examiner*—Kriellion Sanders
(74) *Attorney, Agent, or Firm*—Harness, Dickey & Pierce, P.L.C.

(57) ABSTRACT

Non-petroleum based oils replace traditional process oils used in rubber compositions in general and specifically in footwear applications. The replacement oils, derived from plant or animal sources, represent a renewable resource and provide other advantages. The oils contain a sufficient level and distribution of fatty acid side chains to partially incorporate into the rubber at low levels, and to act as internal plasticizers at higher levels. Other compositions are free of silane coupling agents and additives that generate carcinogenic nitrosamines.

60 Claims, No Drawings

RUBBER COMPOSITIONS WITH NON-PETROLEUM OILS

FIELD OF THE INVENTION

The present invention relates to rubber compounding with sulfur or peroxide crosslinking agents. In particular the invention relates to rubber compositions containing non-petroleum oils.

BACKGROUND OF THE INVENTION

Synthetic and natural rubbers have a variety of unique and useful physical properties. In an uncured or natural state, such materials generally exhibit properties that are less than optimal for everyday or industrial use. Accordingly, rubber compositions are generally reacted with crosslinkers such as those containing sulfur or peroxides in order to cure the rubber. In general, heat is applied to a rubber composition during a molding operation to produce molded articles having desired physical properties.

Athletic footwear have rubber outsoles that meet a variety of performance specifications. The outsoles are generally prepared from silica filled rubber compositions by heating the compositions for suitable times and temperatures in compression molds. To compatibilize the rubber resins with the filler and improve the physical properties, silane coupling agents are commonly used.

Typical rubber compounds require the use of a process oil to facilitate both compounding and processing. As a rule, the process oils come from petroleum. As such, they represent a non-renewable resource, and can contain a variety of potentially harmful components such as aromatic compounds. The process oils may be hydrotreated to remove at least a large portion of the aromatic compounds; however such a hydrotreatment step adds increased costs.

Under some manufacturing conditions it is economically feasible to replace petroleum based components in a rubber composition with components from renewable sources. For example, it has been proposed to replace mineral oil in tires with vegetable oil at relatively high levels in order to produce tires having a greater proportion of renewable resources that have an acceptable rolling resistance. Under other conditions, it is desirable to reduce or completely eliminate the level of certain processing agents such as silanes in rubber compositions. It has been found that the use of low levels of a non-petroleum oil in rubber compositions leads to the use of a greater amount of renewable resources in the compositions, and can provide other health and technological benefits.

SUMMARY

A rubber composition is described that uses non-petroleum based oils to replace traditional process oils used in rubber compositions in general and specifically in footwear applications. The replacement oils, derived from plant or animal sources, represent a renewable resource and provide other advantages. In one aspect, the vegetable oils can be classified by their iodine number. Plant and animal derived oils contain double bonds, and each double bond can react with one iodine molecule. The iodine number, defined as the number of grams of iodine taken up by 100 grams of oil, gives a rough measure of the number of double bonds in an oil. During rubber curing or crosslinking the double bonds are available for reaction with the rubber molecules in the presence of either sulfur or peroxide curing agents. In this way, the plant or animal derived oils can facilitate processing of the rubber during the compounding phase and can be incorporated into the rubber network during the curing phase. They can act as an internal plasticizer that does not bloom to the surface, or they can act as a reinforcement that enhances the physical properties of the rubber composition.

In another aspect, the preferred non-petroleum oils are distinguished not by iodine number but by chemical structure. According to this model, the oils are represented as tri-esters or triglycerides. The oils are characterized in having three fatty acid side chains. Oils such as plant and animal derived oils contain a wide variety of fatty acids, but each species is characterized by a certain fatty acid chain composition. The fatty acid chains may be saturated, or may contain one or more double bonds. Fatty acid chains containing one or more double bonds are referred to as unsaturated fatty acids. In this model, a plant or animal derived oil is capable of effectively crosslinking a rubber composition during curing if the oil molecule contains a double bond on two or more of the three fatty acid side chains in an oil molecule. Referring to the fatty acid composition typical of each species of the animal or vegetables, in one aspect of the invention, oils are preferred if at least 50% of the fatty acid side chains have one or more sites of unsaturation.

Further areas of applicability of the present invention will become apparent from the detailed description provided hereinafter. It should be understood that the detailed description and specific examples, while indicating various embodiments of the invention, are intended for purposes of illustration only and are not intended to limit the scope of the invention.

DETAILED DESCRIPTION

Moldable rubber compositions are provided that contain a rubber resin, a curing agent, a reinforcing filler such as silica, and a non-petroleum oil. The rubber resin is selected from the group consisting of natural rubber, synthetic rubber, and mixtures thereof. The non-petroleum oil is of plant or animal origin and contains fatty acid side chains. The plant derived oils are also referred to as vegetable oils. At least 50% of the fatty acid side chains have one or more sites of unsaturation. In other embodiments, at least 67% of the fatty acid side chains of the oils have unsaturation. In some embodiments the moldable rubber compositions contain less than 5 phr (parts per hundred parts of rubber) of the non-petroleum oil, preferably less than or equal to 3 phr.

The non-petroleum oil is characterized by fatty acid side chains having unsaturation as discussed above. In some embodiments, the oil may be further characterized by an iodine number of greater than 50 and preferably, greater than 60.

The rubber resin may be made up of natural rubber, synthetic rubber, or mixtures. In preferred embodiments, the rubber resin contains less than 50% by weight natural rubber. The curing agents may be a sulfur curing agent or a peroxide curing agent. The compositions may further contain a metal compound such as one selected from the group consisting of titanium or zirconium with one or more alkoxy groups OR bonded to the titanium or zirconium. Mixtures of such metal compounds may also be used. In some embodiments, the zirconium or titanium metal compounds are a chelate. Although the moldable rubber compositions contain reinforcing fillers such as silica, in some embodiments, the compositions are essentially lacking in silane coupling agents.

Molded rubber articles are also provided by molding and curing rubber compositions such as described above. The molded rubber articles contain a rubber cured component, filler, and less than or equal to 5 phr of the non-petroleum oil discussed above. The non-petroleum oil exists in a form at least partially incorporated into the cured rubber component. In some embodiments, the molded rubber article contains less than or equal to 3 phr of the oil. Although the molded rubber article may contain from about 10 to about 60 phr filler, in some embodiments, the rubber articles contain essentially no silane coupling agents. The cured rubber component may be sulfur crosslinked or peroxide crosslinked. In preferred embodiments, the cured rubber component contains less than 50% by weight of cured natural rubber. In other embodiments, the cured rubber component contains less than 20% by weight of cured natural rubber, and in other embodiments, less than 10% by weight cured natural rubber. The molded rubber articles may also further contain the titanium and zirconium compounds discussed above. In one embodiment, the invention provides for rubber shoes molded out of compositions such as described above.

Methods of producing rubber footwear components are also provided. The methods entail heating a moldable rubber composition such as described above at a temperature and for a time sufficient to effect cure. The rubber composition contains a natural or synthetic rubber, a sulfur crosslinker, a silica filler, and less than or equal to 5 phr of the non-petroleum oil discussed above. The footwear component may also contain the titanium or zirconium metal compounds described above. In some embodiments, the rubber composition and the molded footwear component are essentially free of silane coupling agents. In some embodiments, it is preferred to use non-petroleum oils having a relatively high degree of unsaturation. For example, it may be preferred to use oils having an iodine number of greater than 100, or greater than 120. Typically, the molded rubber footwear component is used as an outsole of an athletic shoe.

Shoes contain molded outsoles, wherein the outsoles contain filler, preferably silica filler, a sulfur cured rubber component, and less than or equal to 5 phr of the non-petroleum oil described above. The oil is at least in part covalently incorporated into the cured rubber component of the molded outsole. As a molded rubber article, the outsole contains components derived from petroleum resources. In a preferred embodiment, a shoe is provided wherein the outsole contains less than 75% by weight of components derived from non-petroleum resources. Preferably, the cured rubber component contains less than 50% by weight natural rubber, and more preferably, less than 20% by weight or less than 10% by weight natural rubber. The molded outsole may further contain up to 10 phr of a rubber regrind material, preferably up to 5 phr of a rubber regrind.

A rubber sole for a shoe may be made by curing a moldable rubber composition containing a rubber accelerator that generates a non-carcinogenic nitrosamine. The rubber compositions further contain a rubber resin selected from the group consisting of natural rubber, synthetic rubber, and mixtures thereof, as well as a sulfur crosslinking agent, and the non-petroleum based process oil described above. A non-limiting example of a rubber accelerator that generates non-carcinogenic nitrosamines is tetrabenzylthiuram disulfide. The shoe sole generally further contains a silica filler, and in some embodiments, contains essentially no silane coupling agents, despite the presence of the silica filler. As above, the shoe may be made from a composition that contains up to 10 phr of a rubber regrind, preferably up to 5 phr of rubber regrind.

In general, rubber compositions may be provided having a desirable combination of health and environmental features. For example, a moldable rubber composition may comprise:
a rubber resin selected from the group consisting of natural rubber, synthetic rubber, and mixtures thereof;
0.1 to 25 phr of a vegetable oil having an iodine number greater than 50;
0.1 to 10 phr S, present in a sulfur crosslinking agent;
0.01 to 2 phr TBzTD;
0.01 to 10 phr MBTS;
1 to 100 phr reinforcing filler such as silica;
0.1 to 25 phr of rubber regrind, and
in some embodiments, no silane couple agents.

For rubber outsoles, the moldable rubber compositions preferably contain from about 0.1 to about 5 phr of vegetable oil. In other embodiments, the compositions contain a maximum of 3 phr vegetable oil, or less than 3 phr. In other embodiments, the compositions may contain from 0.1 to 2 phr vegetable oil. Non-limiting examples of vegetable oils include peanut oil, sunflower oil, cottonseed oil, linseed oil, soybean oil, rapeseed oil, sesame oil, safflower oil, poppy seed oil, tung oil, wheat oil, olive oil, palm oil, coconut oil, corn oil, palm-kernel oil, castor oil, cocoa butter, cocoa oil, and mixtures thereof.

Animal derived oils may also be used at these levels. Molded rubber articles may be made by molding and curing such compositions for a time and at a temperature sufficient to effect cure.

Rubber compositions can contain natural or synthetic rubber, or mixtures of rubber, as well as rubber additives such as curing agents, accelerators, fillers and the like. The compositions also contain a non-petroleum oil, such as those of animal or vegetable origin, as processing aids during compounding and curing of the compositions. As discussed below and demonstrated in the examples, it is believed that the non-petroleum oils are at least partially incorporated covalently into the cured rubber component during the molding and especially the curing operations.

In some embodiments, any rubber that can be crosslinked by a sulfur cure can be used in the compositions. Sulfur cure describes a vulcanization process typical of making rubber. In other embodiments, rubber capable of being cured by a peroxide crosslinking mechanism may be used.

The rubbers may be natural rubber or synthetic rubbers. Examples of synthetic rubbers include without limitation, synthetic polyisoprenes, polybutadienes, acrylonitrile butadiene rubber, styrene acrylonitrile butadiene rubber, polychloroprene rubber, styrene-butadiene copolymer rubber, isoprene isobutylene copolymer rubber and its halogenated derivatives, ethylene-propylene-diene copolymer rubbers such as ethylene-propylene-cyclopentadiene terpolymer, ethylene-propylene-5-ethylidene-norbornene terpolymer, and ethylene-propylene-1,4-hexadiene terpolymer, butadiene-propylene copolymer rubber, butadiene-ethylene copolymer rubber, butadiene-isoprene copolymer, polypentenamer, millable urethanes and their mixtures. In one aspect, such compounds are characterized by repeating olefinic unsaturation in the backbone of the polymer, which may arise, for example, from the presence of butadiene or isoprene monomers in the polymer structure.

Conventional sulfur based curing agents may be used in the compositions of the invention. Such curing agents are well known in the art and include elemental sulfur as well as a variety of organic sulfide, disulfide and polysulfide compounds. Examples include, without limitation, vulcanizing agents such as morpholine disulfide, 2-(4'-morpholinodithio)benzothiazole, and thiuram compounds such as tetramethylthiuram disulfide, tetraethylthiuram disulfide and dipentamethylenethiuram tetrasulfide. The vulcanizing agents may be used alone or in combination with each other. In a preferred embodiment, sulfur is used as the curing agent.

The rubbers may also be crosslinked with a crosslinking agent. A peroxide crosslinking agent is required to crosslink rubbers that do not contain olefinic unsaturation. The peroxide can be any organic peroxide that can decompose and yield free radicals capable of crosslinking the rubber resin. Typical methods used to induce peroxide decomposition to yield the free radicals include heat, visible light, and ultraviolet light. For most rubber compounds, heat is a preferred method of inducing decomposition because the rubber composition tends to be opaque. However, in the case of clear rubbers, UV and visible light may be used to initiate the decomposition.

The rubber compositions of the invention also in general, contain accelerators. Such accelerators and co-accelerators are known in the art and include without limitation, those based on dithiocarbamate, thiazole, amines, guanidines, xanthates, thioureas, thiurams, dithiophosphates, and sulfenamides. Non-limiting examples of accelerators include: zinc diisobutyldithiocarbamate, zinc salt of 2-mercaptobenzothiazole, hexamethylenetetramine, 1,3-diphenyl guanidine, zinc isopropyl xanthate, trimethylthiourea, tetrabenzyl thiuram disulfide, zinc O,O-di-n-butylphosphorodithioate, and N-t-butyl-2-benzothiazylsulfenamide.

It may be desired to provide rubber compositions that cure and can be processed with a minimum of emissions of potentially harmful by products. In some embodiments, it is preferred to use accelerators and co-accelerators that generate nitrosamines known to be non-carcinogenic. One such accelerator is tetrabenzylthiuram disulfide. It is known to generate a nitrosamine, N-nitrosodibenzylamine, which is not carcinogenic according to published literature. A preferred co-accelerator is MBTS or 2,2'-dithiobisbenzothiazole.

The compositions generally contain reinforcing fillers. Such fillers include silica, carbon black, clay, organic fiber, inorganic metal powder, mineral powder, talc, calcium sulfate, calcium silicate, and the like. Silica is preferred in some embodiments. Typical compositions for use in preparing molded rubber outsoles for athletic shoes contain about 10 to about 60 phr filler.

The rubber compositions may optionally contain a titanium or zirconium compound. The zirconium or titanium compounds of the invention can be characterized as those which contain a alkoxy group—OR bonded respectively to titanium or zirconium. Mixtures of the zirconium and titanium compounds of the invention may also be used. Generally, the R group of the alkoxy group is an alkyl group having 8 or fewer carbon atoms. In a preferred embodiment, the R group contains 6 or fewer carbons, and more preferably contains 4 or fewer carbon atoms. Examples of alkyl groups containing 4 or fewer carbon atoms include methyl, ethyl, n-propyl, isopropyl, n-butyl, isobutyl, sec-butyl, and t-butyl.

In a preferred embodiment, the titanium or zirconium compound has 2 alkoxy groups bonded to the titanium or zirconium. In another preferred embodiment, there are 4 alkoxy groups—OR bonded to the central titanium or zirconium atom where R is as described above. Based on the above, there are several forms of the titanium and zirconium compounds. Preferred compounds include the tetralkyl (those having four alkoxy groups bonded to the metal) and the chelate forms. A class of compounds that has shown good utility in the present invention is the chelates. Chelates, in general, are those titanium or zirconium compounds that are complexed with an organic ligand system that contains two atoms or functional groups capable of forming covalent or dative bonds to the central titanium or zirconium compound. Generally, the atoms or functional groups which form covalent or dative bonds to the central atom are those that are highly electronegative and include oxygen, nitrogen, and sulfur. The two atoms or functional groups providing the ligand to the central titanium and zirconium atoms may be the same or different. In a preferred embodiment, the atoms bonded to the central titanium or zirconium atom through the chelate are oxygen. Examples of chelating ligands include, without limitation, acetylacetonate, ethyl acetylacetonate, triethanolamine, lactic acid and its salts such as the ammonium salt, glycolic acid and its salts, and esters of citric acid, such as diethyl citrate. A well known chelate useful in the invention is the titanium acetylacetonate chelate compound illustrated by the following formula:

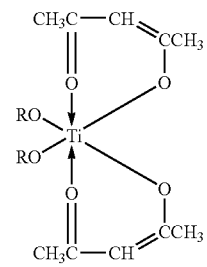

where R comprises an alkyl group of 8 carbons or less, preferably 6 carbons or less, and more preferably 4 carbons or less. Here the chelate contains two alkoxy groups OR and a central titanium atom on which two acetylacetone groups are chelated. It can be seen that the titanium atom, the two dative bonding groups on the chelate molecule, and the atoms bridging the two dative bonding groups form a six membered ring. In general, chelates of the invention include those which form from a five to an eight membered ring with the titanium atom and the two dative bonding groups of the chelating ligand. In the FIGURE, the R groups are as described above. In a preferred embodiment, the R groups in the FIGURE are isopropyl. Other chelates may be used in the rubber compositions of the invention. The above FIGURE is provided for illustration only. In other preferred embodiments, other chelating ligands such as triethanolamine, lactic acid ammonium salt, diethyl citrate, and ethyl acetylacetonate are used. It is also possible to substitute zirconium for titanium in the structure illustrated above.

The zirconium or titanium chelates are generally highly colored, ranging from yellow to a dark red. This generally provides no problems if the chelate compounds are to be formulated into black rubber compositions. On the other hand, if white or lightly colored rubber compositions are to be formulated, then tetralkyl and polymeric forms of the titanium and zirconium compounds are preferred, as they are not as deeply colored.

The compositions of the invention contain an effective amount of the titanium or zirconium compound. Generally, the compositions will have from about 0.01 parts to about 10 parts per hundred parts of rubber resin (phr) of the titanium or zirconium compound. Depending on the variety of rubber, and additives such as accelerators and fillers, formulations have been compounded at amounts ranging from about 0.1 to about 5 phr by weight of the titanium or zirconium compound. Generally, the compounds are available in as supplied form from about 70% to greater than 98% active.

In a preferred embodiment, the titanium or zirconium compounds have four alkoxy groups. For a titanium compound, the general structure can be represented by the formula

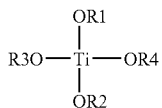

where the structure depicted is a tetralkyl titanate. For a zirconium compound, the formula is the same except that zirconium is substituted for titanium as the central atom. The organic side chains can be represented by R1, R2, R3, and R4. In general, R1, R2, R3, and R4 can be the same or different. When the R groups are identical it is common to depict the tetralkyl titanate by the general formula $Ti(OR)_4$. An example of a tetralkyl titanate where all the R groups are identical is tetra n-butyl titanate. In the formula, the titanium has 4 alkoxy groups OR wherein R is an alkyl group of 8 carbons or less. Preferably R is an alkyl group of 6 carbons or less. In a preferred embodiment, the alkyl groups are of 4 carbons or less as discussed above for the chelates. It appears that the length of the pendant organic group determines the effectiveness of the titanium or zirconium compound to reduce the cure temperature of rubber compositions of the invention. Without being bound by theory, it is believed that the lower molecular weight side chains such as those containing 8 carbons or less and preferably 6 carbons or less and more preferably 4 carbons or less, will cause the titanium or zirconium compound to break down at relatively lower temperatures and hence produce their catalytic effect. As the molecular weight of the pendant organic groups increases, the compound in generally becomes more thermally stable and is less capable of having a catalytic effect on cure.

Another sub-class of titanium or zirconium compounds useful in the invention is the polymeric titanates or zirconates. The titanates can be represented by the general structure

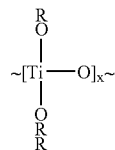

where x represents the degree of polymerization. The zirconates are like the titanates, with zirconium substituted for titanium. Such polymeric titanate materials can be made by condensing a tetralkyl titanate, as described for example in U.S. Pat. No. 2,621,193. The analogous polymeric zirconates can be synthesized by the procedure outlined for the polymeric titanates. The R group in the alkoxy group—OR in the formula above is defined as for the chelates and for the tetralkyl titanates.

Titanium and zirconium compounds of the invention are commercially available for example from DuPont under the Tyzor® trade name. One example is Tyzor AA-75, which is a 75% solution in isopropanol of titanium diisopropyl acetylacetonate. Another is Tyzor® BTP, which is poly n-butyl titanate.

It may be desirable to protect the titanium and/or zirconium compounds from hydrolysis during use. In general, it is observed that the tetralkyl zirconates and titanates tend to have a higher rate of hydrolysis than the chelate compounds. The susceptibility to hydrolysis increases as the size of the R group on the alkoxy group—OR decreases. The zirconium compounds tend to be more sensitive than the titanium compounds to moisture. When susceptibility to hydrolysis of the compounds of the invention is a concern, it has been found useful to provide the zirconium or titanium compounds of the invention as auxiliary compositions in the form of masterbatches. To make the masterbatches, the zirconium or titanium compound is admixed with a hydrophobic material that protects it from moisture. In a preferred embodiment, the hydrophobic compound comprises a petroleum wax or a partially hydrogenated vegetable oil. When the zirconium compound or titanium compound is provided in liquid form, it is often desirable to add a carrier to the composition to bind the zirconium or titanium compound. A commonly used carrier is silica. When dark colored or black rubber compositions are to be formulated it is possible to use carbon black as a carrier. When light colored or white formulas are to be made, it is possible to use titanium dioxide as a carrier to make the masterbatches of the invention.

The rubber compositions may also contain coupling agents, such as those based on silanes. When present, the silane coupling agents contribute to the stability and physical properties of the compositions, for example, by compatibilizing or coupling the reinforcing filler with the rubber components. Silane coupling agents include those with amino, epoxy, (meth)acryl, chloro, and vinylyl functionality.

Examples of amino functional silane coupling agents include aminopropyltriethoxysilane; aminopropyltrimethoxysilane; aminopropylmethyldimethoxysilane; aminoethylaminopropyltrimethoxysilane; aminoethylaminopropyltriethoxysilane; aminoethylaminopropylmethyldimethoxysilane; diethylenetriaminopropyltrimethoxysilane; diethylenetriaminopropyltriethoxysilane; diethylenetriaminopropylmethyldimethoxysilane; diethylenetriaminopropylmethyldiethoxysilane; cyclohexylaminopropyltrimethoxysilane; hexanediaminomethyldiethoxysilane; anilinomethyltrimethoxysilane; anilinomethyltriethoxysilane; diethylaminomethyltriethoxysilane; (diethylaminoethyl)methyldiethoxysilane; and methylaminopropyltrimethoxysilane.

Examples of sulfur functional silane coupling agents include bis(triethoxysilylpropyl)tetrasulfide; bis(triethoxysilylpropyl)disulfide; bis (3-ethoxydimethylsilylpropyl) oligosulfur; mercaptopropyltrimethoxysilane; mercaptopropyltriethoxysilane; mercaptopropylmethyldimethoxysilane; and 3-thiocyanatopropyltriethoxysilane.

Examples of epoxy silane coupling agents include: glycidoxypropyltrimethoxysilane; glycidoxypropyltriethoxysilane; glycidoxypropylmethyldiethoxysilane; and glycidoxypropylmethyldimethoxysilane.

Examples of (meth)acryl silane coupling agents include: methacryloxypropyltrimethoxysilane; methacryloxypropyltriethoxysilane; and methacryloxypropylmethyldimethoxysilane.

Examples of chloro silane coupling agents include: chloropropyltrimethoxysilane; chloropropyltriethoxysilane; chloromethyltriethoxysilane; chloromethyltrimethoxysilane; and dichloromethyltriethoxysilane.

Examples of vinylyl silane coupling agents include: vinyltrimethoxysilane; vinyltriethoxysilane; and vinyltris(2-methoxyethoxy)silane.

It has been found that compositions containing low levels of the non-petroleum oils described below can produce molded articles such as molded outsoles for athletic shoes having acceptable physical properties, even in the absence of conventional silane coupling agents. Such compositions and molded articles produced from them may provide environmental and health benefits.

The non-petroleum based process oil may be an oil derived from non-petroleum resources. Such non-petroleum resources include those of plant (vegetable) and animal origin. An oil is typically described as a mono-, di-, or triglyceride. The oil molecules typically have one, two, or three long chain fatty acids connected by an ester linkage to a polyol that is typically glycerin. The long chain fatty acids may or may not have unsaturation in the chain. Most oils have at least some small level of unsaturation, however, not every long chain acid is required to have unsaturation. In some aspects of the invention, at least 50% of the fatty acid side chains contain at least one double bond. In other embodiments, at least 67% contain one double bond. If 50% of the side chains of a triglyceride contain one double bond, then statistically about half of the oil molecules will contain double bonds on more than one "arm" of the triglyceride. This is believed to lead to efficient incorporation of the oil molecule into the curing rubber system.

Oils of animal and plant origin may be characterized by the chemical make up and relative content of their fatty acid side chains. Typically, the fatty acid side chains are divided into saturated, monounsaturated, and polyunsaturated side chains. Examples of saturated side chains include myristic acid, palmitic acid, and stearic acid. Non-limiting examples of monounsaturated fatty acids include palmitoleic acid, oleic acid, eicosenoic acid, erucic acid, and ricinoleic acid. Non-limiting examples of polyunsaturated fatty acids include linoleic acid, linolenic acid, and higher polyunsaturated fatty acids. The most common saturated oils contain from 14–18 carbon atoms, while the most common monounsaturated fatty acids contain from 16 to 22 carbons. Linoleic and linolenic acid, the polyunsaturated acids mentioned above, both contain 18 carbons, with the former containing two double bonds and the latter three double bonds. The table gives the percent saturated, percent monounsaturated and percent polyunsaturated fatty acids in a variety of non-petroleum oils of animal and plant origin. Compositional information on the fatty acid content of oils is available from a variety of sources. The values in the table are predominantly from *Handbook of Chemistry and Physics*, 56th Edition, © Chemical Rubber Corporation.

Fatty Acid Content and Iodine number of Selected Oils

| Oil | Total Saturated | Total Monoun-saturated | Total Polyun-saturated | Iodine number[4] |
|---|---|---|---|---|
| Animal origin | | | | |
| Lard oil | 41.5 | 50.2 | 6.0 | 59 |
| Neat's-foot oil | 21.0 | 76.0 | 0.0 | 69~76 |

Fatty Acid Content and Iodine number of Selected Oils

| Oil | Total Saturated | Total Monoun-saturated | Total Polyun-saturated | Iodine number[4] |
|---|---|---|---|---|
| Beef Tallow | 47.8 | 49.6 | 2.5 | 50 |
| Mutton Tallow | 59.7 | 36.0 | 4.3 | 40 |
| Cod-liver oil | 14.8 | 35.0 | 50.0 | 165 |
| Herring oil | 20.3 | 4.9 | 74.0 | 140 |
| Menhaden oil | 23.4 | 15.5 | 61.1 | 170 |
| Sardine oil | 22.9 | 21.8 | 55.3 | 185 |
| Sperm oil, body | 13.5 | 63.5 | 23.0 | 76~88 |
| Sperm oil, head | 47.5 | 32.0 | 20.5 | 70 |
| Whale oil | 27.9 | 49.6 | 22.2 | 120 |
| Plant origin | | | | |
| Babassu oil | 82.3 | 17.5 | 0.0 | 10~18 |
| Canola oil | 7.2 | 63.5 | 29.6 | 116~120 |
| Castor oil | 3.0 | 92.5 | 4.5 | 82~89 |
| Cocoa butter | 59.8 | 38.1 | 2.1 | 37 |
| Coconut oil | 91.2 | 7.9 | 0.0 | 6~12 |
| Corn oil | 13.3 | 25.3 | 61.4 | 103~140 |
| Cottonseed oil | 27.2 | 24.9 | 47.8 | 90~119 |
| Linseed oil | 9.3 | 19.0 | 71.7 | 168~204 |
| Mustard oil | 1.3 | 78.2 | 20.5 | 102 |
| Neem oil | 41.5 | 58.5 | 0.0 | 71 |
| Oiticica oil | 11.3 | 6.2 | 82.5 | 140~180 |
| Olive oil | 13.2 | 76.9 | 8.9 | 75~94 |
| Palm oil | 47.0 | 42.7 | 10.3 | 35~61 |
| Palm-kernel oil | 81.0 | 18.5 | 0.7 | 37 |
| Peanut oil | 13.8 | 56.0 | 30.2 | 80~106 |
| Poppy-seed oil | 7.7 | 30.1 | 62.2 | 135 |
| Rapeseed oil | 1.0 | 82.0 | 16.0 | 94~120 |
| Safflower oil | | | | |
| High Oleic | 6.0 | 77.0 | 15.0 | 90~100 |
| High Linoleic | 8.0 | 15.0 | 77.0 | 126~152 |
| Sesame oil | 6.8 | 18.6 | 73.5 | 104~120 |
| Soybean oil | 14.9 | 18.5 | 60.4 | 117~143 |
| Sunflower-seed oil | 11.0 | 4.1 | 68.8 | 110~143 |
| Tung oil | 4.6 | 4.1 | 91.3 | 168 |
| Wheat Oil | 16.0 | 28.1 | 55.9 | 125 |

The iodine number given in the table is the number of grams of iodine taken up by 100 grams of oil, when iodine is reacted to add across the double bond of the unsaturated sites of the oil. Each double bond in the non-petroleum oil in the table can react with iodine. The iodine number therefore gives a rough measure of the number of double bonds available for reaction available in the oil. During rubber curing or crosslinking, the double bonds of the oils are available for reaction with either sulfur or peroxide curing agents.

In some embodiments, the iodine number of preferred oils is 50 or greater and in others the iodine number is 60 or greater. Other preferred oils have an iodine number greater than 100, or greater than 120. The higher the iodine number, the greater the amount of double bonds available for crosslinking and incorporation into the cured rubber component of the composition and articles of the invention.

In another aspect, non-petroleum oils are preferred if at least about 50% of the fatty acid side chains in the oil have one or more sites of unsaturation. Statistically, about half of the triglycerides in such a composition will contain two or more side chains having unsaturation. Assuming random distribution of fatty acids among the triglycerides, for every glyceride with two out of three unsaturated side chains, there will be a glyceride with only one out of three unsaturated chains, and for every glyceride with three unsaturated chains, there will be one with no unsaturated chains. In such a case, at least half of the oil molecules can fully participate in crosslinking reactions during the rubber curing process. It is believed that when an oil molecule is covalently incorporated into the cured rubber component during crosslinking, the crosslinked oil acts to improve physical properties such as hardness and modulus. When an oil is not incorporated into the cured rubber component during crosslinking—such as would occur either if the oil molecule contains only one or no side chains with unsaturation or if the oil has two or more side chains with unsaturation but is provided in excess—the oil tends to soften or plasticize the composition, leading to lower hardness, increased abrasion and other potentially undesirable physical properties for a cured rubber composition such as an athletic shoe sole. In other words, preferred oils may be incorporated covalently into the cured rubber component of molded articles at a higher level, without undesirable side affects such as the softening due to action as a plasticizer.

The titanate and zirconate compounds described may exhibit another benefit when using a blend of oils with high and low amounts of saturated fatty acid side chains. The titanates and zirconates are known transesterification catalysts. Statistically, an oil in which greater than 67% of fatty acid side chains contain at least one unsaturation can have all the oil molecules react in a crosslinking manner to reinforce the cured rubber. Therefore, the inclusion of the titanates or zirconates can cause a rearranging of the fatty acid side chains in an oil blend to a more uniform distribution when using one oil with less than 50% of its fatty acid side chains containing at least one unsaturated carbon-carbon bond and another oil with greater than 50% of its fatty acid side chains containing at least one unsaturated carbon-carbon bond. For example, cocoa butter contains ~60% saturated fatty acid side chains, and linseed oil contains ~10% saturated fatty acid side chains. With 60% saturated fatty acid side chains, only 20% of the oil molecules can participate in a crosslinking reaction via sulfur crosslinks. The other 80% would be incorporated as an internal plasticizer. A 50/50 blend of these two oils with a transesterification catalyst that rearranged the fatty acid side chains to be more evenly distributed would render 95% of the oil molecules capable of participating in crosslink formation.

Castor oil has unique chemistry in that it is the only source of an 18 carbon hydroxylated fatty acid with one double bond (12-hydroxyoleic acid or ricinoleic acid). This fatty acid consistently comprises about 90% of castor oil. The presence of hydroxyl groups provides this oil with advantages, especially in predominantly saturated rubbers such as butyl (IIR) and halogenated butyl rubbers (BIIR, CIIR). Butyl rubber is very difficult to bond to other substances, due to its low unsaturation and generally inert surface; thus, solvent-based adhesives are required, or it has to be blended with diene rubbers. Blending with diene rubbers adversely affects its very special properties such as high damping and low air permeability. The inclusion of castor oil provides numerous bonding sites for water-based adhesives through the hydroxyl groups—average of 2.7/molecule. Even though the hydroxyl groups would be expected to affect the solubility of castor oil in highly saturated rubbers, it still maintains limited solubility in petroleum solvents. The incorporation into rubber can be facilitated by blending with other vegetable oils.

Castor oil can also be used in more polar rubber compounds such as millable urethanes and halogenated rubbers. This is especially advantageous, since traditional petroleum oils have limited solubility in these types of rubbers.

Hydrogenated non-petroleum oils may also be used. Partial hydrogenation of the oils will convert some of the double bonds to single bonds with the addition of hydrogen. It may also convert some or all of the remaining double bonds from cis to trans configuration. Hydrogenated oils may be used as long as they meet the criteria of a minimum percent of the fatty acids having one or more sites of unsaturation and/or a minimum value of iodine number, or they may be blended with other oils to meet one of these criteria.

The non-petroleum oils may replace completely or in part the petroleum based process oils previously used in rubber compositions. Petroleum based oils can be selected from the group consisting of paraffinic oils, naphthenic oils, and aromatic oils.

The rubber compositions of the invention can be compounded in conventional rubber processing equipment. In a typical procedure, all components of the rubber composition are weighed out. The rubber and additives are then compounded in a conventional mixer such as a Banbury mixer. If desired, the compounded rubber may then be further mixed on a roller mill. At this time, it is possible to add pigments such as carbon black. The composition may be allowed to mature for a period of hours prior to the addition of sulfur and accelerators, or they may be added immediately on the roller mill. It has been found to be advantageous to add the accelerators into the Banbury mixer in the later stages of the mixing cycle. Adding the accelerators into the Banbury mixer generally improves their distribution in the rubber composition, and aids in the reduction of the cure time and temperatures that is observed in the compositions of the invention. In general, the elemental sulfur curing compound is not added into the Banbury mixer. Organic sulfides (sulfur donating compounds) may be added to the Banbury mixer.

The compositions may be processed and cured by placing the compositions into a heated mold. The mold is placed into a press and held for a specified period of time at a temperature sufficient to achieve cure. Typically, the curing time is obtained from a rheometer curve, such as conventional in the rubber processing industry. For example, the moldable rubber compositions may be cured for a time equal to T90 plus one minute, where T90 is the time required for 90% of the viscosity to develop. Typical temperatures are generally from about 145 to 165° C., and typical times can range from 3–9 minutes, though processing outside these times and temperature ranges is also possible, especially in large parts with thick cross sections.

The invention has been described above with reference to preferred embodiments. Further non-limiting examples are given below.

EXAMPLES

In Examples 1–5, it is demonstrated that sunflower oil (iodine number 130, 89% of side chains having one or more sites of unsaturation) can replace conventional petroleum based process oil in silica filled rubber compositions. All of the compounds of Examples 1–5 exhibited hardness of greater than 64 Shore A, tensile strength above 100 kg/cm$^2$, elongation above 700%, tear strength above 30 kg/cm, and abrasion loss less than 0.35 cc. The compounds also demonstrated acceptable dry and wet traction.

The compounds of Examples 1–5 were prepared in a lab-scale Banbury mixer with a 3 kg capacity. 5 phr rubber regrind was incorporated into the compositions. The mixing time was approximately seven minutes. After four hours, the sulfur and accelerators were added on an open mill. The cure time was determined by the rheometer curves after one day of maturation. Samples were cured at T90+1 minutes at 150° C.

| Component | Example 1 phr | Example 2 phr | Example 3 phr | Example 4 phr | Example 5 phr |
|---|---|---|---|---|---|
| IR 10 (isoprene rubber) | 10 | 10 | 10 | 10 | 10 |
| NBR 50.75 (acrylonitrile butadiene rubber) | 10 | 10 | 10 | 10 | 10 |
| UBE-BR 150L (butadiene rubber) | 80 | 80 | 80 | 80 | 80 |
| VN-3 (silica filler) | 48 | 48 | 48 | 48 | 48 |
| Process Oil | 0 | 1 | 0 | 3 | 0 |
| Sunflower oil | 0 | 0 | 1 | 0 | 3 |
| Zno-80 (ZnO) | 6.25 | 6.25 | 6.25 | 6.25 | 6.25 |
| PEG (polyethylene glycol)) | 3 | 3 | 3 | 3 | 3 |
| ST/AC (stearic acid) | 1 | 1 | 1 | 1 | 1 |
| BHT (antioxidant) | 1 | 1 | 1 | 1 | 1 |
| Okerin 1956 (antibloom agent) | 0.5 | 0.5 | 0.5 | 0.5 | 0.5 |
| 60NS (homogenizing agent) | 3 | 3 | 3 | 3 | 3 |
| RT1987 (activator) | 1 | 1 | 1 | 1 | 1 |
| R802BLACK-MB (pigment) | 2 | 2 | 2 | 2 | 2 |
| Regrind | 5 | 5 | 5 | 5 | 5 |
| SU135 (sulfur crosslinkers) | 1.8 | 1.8 | 1.8 | 1.8 | 1.8 |
| MBTS-75 | 0.8 | 0.8 | 0.8 | 0.8 | 0.8 |
| TBzTD (tetrabenzyl thiuramdisulfide) | 0.18 | 0.18 | 0.18 | 0.18 | 0.18 |

In Examples 6–11, two vegetable oils were examined: a blend of soybean and peanut oil (iodine number 126) and palm oil (iodine number 56, about 53% of side chains having one or more unsaturation sites). The vegetable oil blend cured faster with a higher viscosity. Comparing physical properties, 3 phr of palm oil had about the same plasticizing effect as 5–10 phr of the high iodine number vegetable oil blend. The influence of the iodine number can also be seen in comparing the abrasion results of Examples 6, 9, and 11, all containing 3 phr oil. As iodine number increases, abrasion loss goes down.

| | Ex 6 PHR | Ex 7 PHR | Ex 8 PHR | Ex 9 PHR | Ex 10 PHR | Ex 11 PHR |
|---|---|---|---|---|---|---|
| COMPONENT | | | | | | |
| STR-5L (natural rubber) | 10 | 10 | 10 | 10 | 10 | 10 |
| NBR50.75 (acrylonitrile butadiene rubber) | 10 | 10 | 10 | 10 | 10 | 10 |
| UBE-BR150L (BR rubber) | 80 | 80 | 80 | 80 | 80 | 80 |
| 175GR (silica filler) | 46 | 46 | 46 | 46 | 46 | 46 |
| ZnO-80 (zinc oxide) | 6.25 | 6.25 | 6.25 | 6.25 | 6.25 | 6.25 |
| PEG (polyethylene glycol) | 3 | 3 | 3 | 3 | 3 | 3 |
| ST/AC (stearic acid) | 1 | 1 | 1 | 1 | 1 | 1 |
| BHT (antioxidant) | 1 | 1 | 1 | 1 | 1 | 1 |
| Okerin 1956 (antibloom agent) | 0.5 | 0.5 | 0.5 | 0.5 | 0.5 | 0.5 |
| 60NS (homogenizing agent) | 1 | 1 | 1 | 1 | 1 | 1 |
| RT1987 (activator) | 1 | 1 | 1 | 1 | 1 | 1 |
| R802BLACK-MB (pigment) | 2 | 2 | 2 | 2 | 2 | 2 |
| Black regrind | 5 | 5 | 5 | 5 | 5 | 5 |
| VO Blend Oil | 3 | 5 | 10 | | | 2 |
| Palm Oil | | | | 3 | 1 | 1 |
| CURE PACKAGE | | | | | | |
| SU135-75 (sulfur) | 2.4 | 2.4 | 2.4 | 2.4 | 2.4 | 2.4 |
| MBTS-75 | 0.8 | 0.8 | 0.8 | 0.8 | 0.8 | 0.8 |
| TBzTD-70 | 0.26 | 0.26 | 0.26 | 0.26 | 0.26 | 0.26 |
| Hardness, Shore A | 73–74 | 68–69 | 62–63 | 64–66 | 69–70 | 66–67 |
| Tensile, kg/cm$^2$ | 128 | 116 | 105 | 128 | 129 | 126 |
| Elongation, % | 542 | 662 | 692 | 704 | 646 | 654 |
| Tear, kg/cm | 70 | 44 | 37 | 46 | 45 | 45 |
| 300% Mod., kg/cm$^2$ | 67 | 34 | 29 | 35 | 41 | 38 |
| Abrasion | 0.245 | 0.319 | 0.436 | 0.345 | 0.272 | 0.298 |

Examples 12–17 show results of rubber compositions prepared with non-petroleum oils (3 phr of the vegetable oil blend of Examples 6–11). These compositions contain from 50~75% of their mass from non-petroleum resources.

| COMPONENT | Ex 12 PHR | Ex 13 PHR | Ex 14 PHR | Ex 15 PHR | Ex 16 PHR | Ex 17 PHR |
|---|---|---|---|---|---|---|
| NR (natural rubber) | 33 | 50 | 70 | 35 | 50 | 30 |
| Taipol 150 (polybutadiene rubber) | 67 | 50 | 30 | 45 | 35 | 60 |
| KA 8802 (styrene acrylonitrile butadiene rubber) | 0 | 0 | 0 | 20 | 15 | 10 |
| 60NS (homogenizing agent) | 1 | 1 | 1 | 1 | 1 | 1 |
| VN3 (silica filler) | 35 | 35 | 35 | 0 | 0 | 0 |
| 165MPJ (silica filler) | 0 | 0 | 0 | 30 | 30 | 43 |
| V O Blend | 3 | 3 | 3 | 3 | 3 | 3 |
| ZnO-80 (zinc oxide) | 5 | 5 | 5 | 4.5 | 4.5 | 4.5 |
| PEG (polyethylene glycol) | 3.5 | 3.5 | 3.5 | 3.5 | 3.5 | 3.5 |
| ST/AC (stearic acid) | 1 | 1 | 1 | 1 | 1 | 1 |
| BHT (antioxidant) | 1 | 1 | 1 | 1 | 1 | 1 |
| Okerin 1956 (antibloom agent) | 0.5 | 0.5 | 0.5 | 0.5 | 0.5 | 0.5 |
| RT1987 (activator) | 1.5 | 1.5 | 1.5 | 1.5 | 1.5 | 1.5 |
| Cure package | | | | | | |
| SU-135-75 (sulfur) | 2.65 | 2.65 | 2.65 | 2.65 | 2.65 | 2.65 |
| MBTS-75 | 0.8 | 0.8 | 0.8 | 0.9 | 0.9 | 0.9 |
| TBzTD-70 | 0.18 | 0.18 | 0.18 | 0.2 | 0.2 | 0.2 |
| % non-petroleum based | 50% | 61% | 74% | 50% | 60% | 51% |
| Hardness, Shore A | 58–59 | 57–59 | 57–59 | 54–56 | 54–57 | 61~63 |
| Tensile, kg/cm$^2$ | 102 | 132 | 163 | 128 | 110 | 155 |
| Elongation, % | 681 | 691 | 661 | 632 | 634 | 820 |
| Tear, kg/cm | 40 | 43 | 50 | 44 | 37 | 45 |
| 300% Modulus, kg/cm$^2$ | 25 | 25 | 30 | 35 | 26 | 25 |
| Abrasion, cc loss | 0.542 | 0.573 | 0.772 | .659 | .799 | .535 |

Examples 18–21 are based on peroxide cured rubbers. The compounds were pressed into test slabs a 155° C. for 5 minutes. Physical properties are given. In general, the physical properties are less affected by differences in unsaturation of the process oil.

| Peroxide Cure | Ex 18 | Ex 19 | Ex 20 | Ex 21 |
|---|---|---|---|---|
| IR (isoprene rubber) | 10 | 10 | 10 | 10 |
| SBR (styrene butadiene rubber) | 15 | 15 | 15 | 15 |
| BR (butadiene rubber) | 75 | 75 | 75 | 75 |
| A1891 50GR (silane coupling agent) | 0.1 | 0.1 | 0.1 | 0.1 |
| MMBI (antioxidant) | 0.25 | 0.25 | 0.25 | 0.25 |
| AEROSIL200 (silica filler) | 31.25 | 31.25 | 31.25 | 31.25 |
| Soybean oil | 5 | | | |
| Vegetable oil blend | | 5 | | |
| Palm oil | | | 5 | |
| Process oil | | | | 5 |
| PL400 (co-agent for crosslinking) | 0.5 | 0.5 | 0.5 | 0.5 |
| ST-AC (stearic acid) | 0.3 | 0.3 | 0.3 | 0.3 |
| TINUVIN-770DF (stabilizer) | 0.25 | 0.25 | 0.25 | 0.25 |
| TINUVIN-P (anti UV-agent) | 0.25 | 0.25 | 0.25 | 0.25 |
| 101-50D (peroxide crosslinker) | 0.4 | 0.4 | 0.4 | 0.4 |
| M3210 (antioxidant) | 3 | 3 | 3 | 3 |
| 3M (peroxide crosslinker) | 0.1 | 0.1 | 0.1 | 0.1 |
| Hardness, Shore A | 64–65 | 63–64 | 65–67 | 63–64 |
| Tensile, kg/cm$^2$ | 78 | 78 | 67 | 73 |
| Elongation, % | 368 | 415 | 302 | 301 |
| Tear, kg/cm | 47 | 47 | 48 | 48 |
| 300% Modulus, kg/cm$^2$ | 50 | 56 | 61 | 71 |
| Abrasion, cc loss | 0.192 | 0.196 | 0.207 | 0.157 |
| Iodine #, Gm I$_2$/100 gm | 128 | 126 | 56 | 32 |

Examples 22–25 are all based on peanut oil (iodine number 99, about 86% of side chains having one or more sites of unsaturation. As the oil increased from 1 to 10 phr, cure time was little affected, but the Mooney viscosity decreased. Above 3 phr, the hardness and abrasion begin to approach less desirable levels, though other physical properties remain good.

| COMPONENT | Ex 22 PHR | Ex 23 PHR | Ex 24 PHR | Ex 25 PHR |
|---|---|---|---|---|
| STR-5L (NR) | 10 | 10 | 10 | 10 |
| NBR50.75 | 10 | 10 | 10 | 10 |
| UBE-BR150L | 80 | 80 | 80 | 80 |

-continued

|  | Ex 22 PHR | Ex 23 PHR | Ex 24 PHR | Ex 25 PHR |
|---|---|---|---|---|
| 175GR | 46 | 46 | 46 | 46 |
| Zno-80 | 6.25 | 6.25 | 6.25 | 6.25 |
| PEG | 3 | 3 | 3 | 3 |
| ST/AC | 1 | 1 | 1 | 1 |
| BHT | 1 | 1 | 1 | 1 |
| 1956 | 0.5 | 0.5 | 0.5 | 0.5 |
| 60NS | 1 | 1 | 1 | 1 |
| RT1987 | 1 | 1 | 1 | 1 |
| R802BLACK-MB | 2 | 2 | 2 | 2 |
| Black regrind | 5 | 5 | 5 | 5 |
| Peanut Oil | 1 | 3 | 5 | 10 |
| Cure Package |  |  |  |  |
| SU135-75 | 2.4 | 2.4 | 2.4 | 2.4 |
| MBTS-75 | 0.8 | 0.8 | 0.8 | 0.8 |
| TBzTD-70 | 0.26 | 0.26 | 0.26 | 0.26 |
| Hardness, Shore A | 67–68 | 64–65 | 61–62 | 58–59 |
| Tensile, kg/cm$^2$ | 120 | 118 | 122 | 97 |
| Elongation, % | 640 | 676 | 709 | 686 |
| Tear, kg/cm | 56 | 48 | 50 | 42 |
| 300% Mod., kg/cm$^2$ | 46 | 41 | 39 | 30 |
| Abrasion | 0.287 | 0.337 | 0.350 | 0.482 |

What is claimed is:

1. A moldable rubber composition comprising;
a rubber resin selected from the group consisting of natural rubber, synthetic rubber, and mixtures thereof;
a curing agent;
a silica filler; and
a non-petroleum oil present at a level of 5 phr or less, wherein the non-petroleum oil comprises fatty acid side chains, wherein at least 50% of the fatty acid side chains have one or more sites of unsaturation.

2. A composition according to claim 1 comprising less than or equal to 3phr non-petroleum oil.

3. A composition according to claim 1, wherein the iodine number is greater than 50.

4. A composition according to claim 1, wherein the iodine number is greater than 60.

5. A composition according to claim 1, wherein at least 67% of the side chains have unsaturation.

6. A composition according to claim 1, wherein the rubber resin comprises less than 50% by weight natural rubber.

7. A composition according to claim 1, comprising a sulfur curing agent.

8. A composition according to claim 1, comprising a peroxide curing agent.

9. A composition according to claim 1, further comprising a metal compound selected from the group consisting of titanium with one or more alkoxy groups OR bonded to titanium, zirconium with one or more alkoxy groups OR bonded to zirconium, and mixtures thereof.

10. A composition according to claim 9, wherein the metal compound is a chelate.

11. A composition according to claim 9, wherein the metal compound comprises titanium.

12. A composition according to claim 1, comprising essentially no silane coupling agent.

13. A composition according to claim 6 where less than 75% by weight of the composition is from non-petroleum resources.

14. A composition according to claim 1 wherein the rubber component contains greater than 50% of rubber selected from the group comprising butyl rubber, halogenated butyl rubber, halogenated rubbers, millable urethanes and mixtures thereof and the non-petroleum oil contains hydroxyl groups.

15. A composition according to claim 14 wherein the non-petroleum oil is comprised of castor oil.

16. A molded rubber article comprising;
a cured rubber component;
silica filler; and
from 0.1 to 5 phr of a non-petroleum oil comprising fatty acid side chains, wherein at least 50% of the fatty acid side chains have one or more sites of unsaturation,
wherein the non-petroleum oil exists in a form at least partially incorporated into the cured rubber component.

17. An article according to claim 16, comprising less than or equal to 3 phr oil.

18. An article according to claim 16, comprising 10 to 60 phr filler.

19. An article according to claim 16, comprising essentially no silane coupling agent.

20. An article according to claim 16, wherein the cured rubber component is sulfur crosslinked.

21. An article according to claim 16, wherein the cured rubber component comprises less than 50% by weight cured natural rubber.

22. An article according to claim 16, wherein the cured rubber component comprises less than 20% by weight cured natural rubber.

23. An article according to claim 16, wherein the cured rubber component comprises less than 10% by weight cured natural rubber.

24. An article according to claim 16, further comprising a metal compound selected from the group of titanium with one or more alkoxy OR bonded to titanium, zirconium with one or more alkoxy groups OR bonded to zirconium, and mixtures thereof.

25. An article according to claim 24, wherein the metal compound is a chelate.

26. An article according to claim 24, wherein the metal compound comprises titanium.

27. A rubber shoe sole according to claim 16.

28. A method for producing a rubber footwear component comprising heating a moldable rubber composition at a temperature and for a time sufficient to effect cure, wherein the rubber composition comprises;
natural or synthetic rubber;
a sulfur crosslinker;
silica filler; and
from 0.1 to 5 phr non-petroleum oil comprising fatty acid side chains, wherein at least 50% of the fatty acid side chains have one or more sites of unsaturation.

29. A method according to claim 28, wherein the rubber composition further comprises a metal compound selected from the group of titanium with one or more alkoxy OR bonded to titanium, zirconium with one or more alkoxy groups OR bonded to zirconium, and mixtures thereof.

30. A method according to claim 28, wherein the rubber composition is essentially free of silane coupling agents.

31. A method according to claim 28, wherein the iodine number of the oil is greater than 100.

32. A method according to claim 28, wherein the iodine number of oil is greater than 120.

33. A method according to claim 28, wherein the rubber composition comprises less than or equal to 3 phr oil.

34. A shoe comprising an outsole made by a process according to claim to 28.

35. A shoe comprising a molded outsole, wherein the outsole comprises:
- silica filler;
- a cured rubber component; and
- a non-petroleum oil comprising fatty acid side chains, wherein at least 50% of the fatty acid side chains have one or more sites of unsaturation, wherein the oil is at least in part covalently incorporated into the cured rubber component.

36. A shoe according to claim 35, wherein the non-petroleum oil has an iodine number greater than 50.

37. A shoe according to claim 35, wherein the non-petroleum oil has an iodine number greater than 60.

38. A shoe according to claim 35, comprising less than 75% by weight of components derived from non-petroleum resources.

39. A shoe according to claim 35, wherein the cured-rubber component comprises less than 50% by weight natural rubber.

40. A shoe according to claim 35, wherein the cured rubber component comprises less than 20% by weight natural rubber.

41. A shoe according to claim 35, wherein the cured rubber component comprises less than 10% by weight natural rubber.

42. A shoe according to claim 35, wherein the outsole comprises up to 10 phr rubber regrind.

43. A shoe according to claim 35, wherein the outsole comprises up to 5 phr rubber regrind.

44. A shoe comprising a cured rubber sole, wherein the rubber sole is made by curing a moldable rubber composition comprising
- a rubber resin selected from the group consisting of natural rubber, synthetic rubber, and mixtures thereof;
- a sulfur-containing crosslinking agent;
- a non-petroleum based process oil; and
- a rubber accelerator that generates non-carcinogenic nitrosamines.

45. A shoe according to claim 44, wherein the moldable rubber composition comprises less than or equal to 5 phr of the non-petroleum based process oil.

46. A shoe according to claim 44, wherein the oil comprises fatty acid chains, wherein at least 50% of the side chains comprise at least one unsaturation site.

47. A shoe according to claim 44, wherein at least 67% of side chains have an unsaturation site.

48. A shoe according to claim 44, wherein the rubber accelerator comprises tetrabenzylthiuram disulfide.

49. A shoe according to claim 44, wherein the process oil comprises a vegetable oil.

50. A shoe according to claim 44, wherein the rubber composition further comprises silica filler.

51. A shoe according to claim 44, wherein the moldable rubber composition comprises essentially no silane coupling agents.

52. A shoe according to claim 44, wherein the moldable rubber composition further comprises up to 10 phr rubber regrind.

53. A shoe according to claim 44, wherein the moldable rubber composition further comprises up to 5 phr rubber regrind.

54. A moldable rubber composition, comprising
- a rubber resin selected from the group consisting of natural rubber, synthetic rubber, and mixtures thereof;
- 0.1–25 phr of vegetable oil having an iodine number greater than 50;
- 0.1–10 phr sulfur;
- 0.01–2 phr tetrabenzylthiurani disulfide;
- 0.01–10 phr 2,2'-dithiobisbenzothiazole;
- 1–100 phr reinforcing filler;
- 0.1–25 phr rubber regrind; and
- no silane coupling agents.

55. A composition according to claim 54, wherein the vegetable oil comprises fatty acid side chains, wherein 50% or more of the side chains comprise more than one site of unsaturation.

56. A composition according to claim 54, comprising 0.1–5 phr vegetable oil.

57. A composition according to claim 54, comprising 0.1–3 phr vegetable oil.

58. A composition according to claim 54, comprising 0.1–2 phr vegetable oil.

59. A molded rubber product, made by molding and curing a composition according to claim 54.

60. A shoe, comprising an outsole according to claim 59.

* * * * *